United States Patent [19]

Miyano

[11] 4,435,288
[45] Mar. 6, 1984

[54] EXPRESSING PLATE ASSEMBLY FOR FILTER PRESS

[75] Inventor: Muneyuki Miyano, Sakai, Japan

[73] Assignee: Kurita Machinery Manufacturing Company Limited, Osaka, Japan

[21] Appl. No.: 392,768

[22] Filed: Jun. 28, 1982

[30] Foreign Application Priority Data

Oct. 9, 1981 [JP] Japan .................................. 56-161779

[51] Int. Cl.$^3$ ........................................... B01D 25/12
[52] U.S. Cl. .................................... 210/227; 210/231; 210/350
[58] Field of Search ................. 210/224, 225, 227–231, 210/350, 486

[56] References Cited

U.S. PATENT DOCUMENTS

| | | | |
|---|---|---|---|
| 3,926,811 | 12/1975 | Ramsteck | 210/227 X |
| 3,931,014 | 1/1976 | Heimbach et al. | 210/231 |
| 3,988,242 | 10/1976 | Kurita et al. | 210/227 |
| 4,229,304 | 10/1980 | Fismer | 210/231 |
| 4,235,721 | 11/1980 | Nakamura et al. | 210/227 |
| 4,251,373 | 2/1981 | Nakamura | 210/228 X |

FOREIGN PATENT DOCUMENTS

| | | | |
|---|---|---|---|
| 1486816 | 7/1969 | Fed. Rep. of Germany | 210/227 |
| 54-3967 | 1/1979 | Japan | 210/231 |
| 55-47927 | 12/1980 | Japan | 210/230 |

*Primary Examiner*—Robert H. Spitzer
*Attorney, Agent, or Firm*—Holman & Stern

[57] ABSTRACT

An expressing plate assembly for an expression type filter press, wherein openings in the four corners of elastic expressing sheets placed on the opposite surfaces of a core plate are aligned with openings in the four corners of the core plate and in such condition the expressing sheets are secured to the core plate. Seating recesses in the form of circles concentric with the above-mentioned openings are formed in the opposite surfaces of the core plate, while raised portions adapted to tightly fit in the recesses are formed on the expressing sheets. Clamping seating rings are fitted in recesses on the outer side of the recesses. Each clamping seating ring is formed with grooves for filtrate.

4 Claims, 8 Drawing Figures

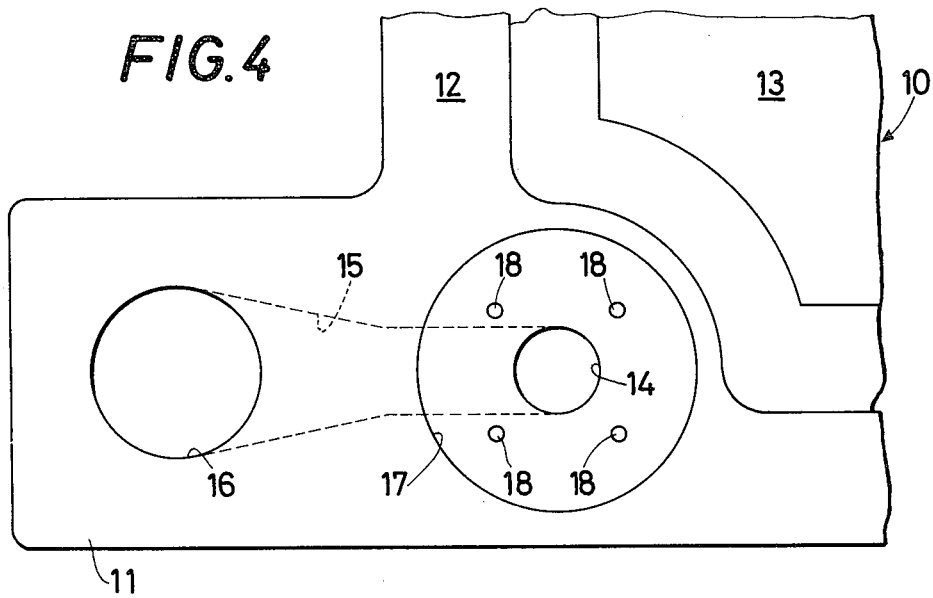
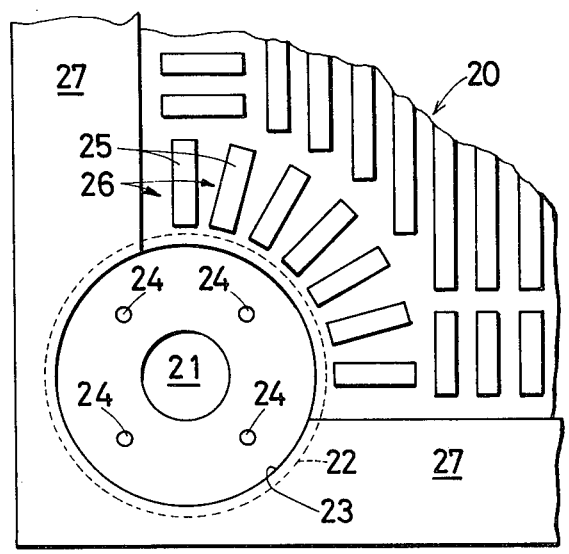

EXPRESSING PLATE ASSEMBLY FOR FILTER PRESS

BACKGROUND OF THE INVENTION

1. Field of The Invention

The present invention relates to an expressing plate for a filter press.

2. Description of the Prior Art

In an expressing filter plate using flexible expressing sheets, generally, the flexible expressing sheets are bonded to the opposite surfaces of a core plate along the peripheral edge and filter cloth is placed thereon to cover the same. In the filtering operation, an expressing fluid is fed in between the core plates and the expressing sheets to expand the expressing sheets to express and filter a raw liquid. The filtrate is discharged into the outside through openings in the lower portions of the expressing sheets and through holes in the core plate continuous with said openings.

After said expression, the expressing sheets contract under their own contracting force, so that the fluid forced in between said sheets and the core is discharged. The expressing sheets develop deformation due to elongation strain each time said filtering operation is repeated. Such deformation upsets the sealed condition between the expressing sheets and the core plate at the expressing fluid inlet holes and filtrate discharge ports, causing misalignment between the discharge ports in the core plate and the openings in the expressing sheets. In extreme cases, said holes would be closed.

If said openings are closed, the filtrate remains in the filtrate chambers, with its pressure cooperating with the pressure of the pressurized fluid held between the expressing sheets and the core plate to develop an abnormal high pressure in the filtrate chambers, leading to fracture of the parts. Accordingly, there has been a disadvantage that it is impossible to increase the expressing pressure for filtering operation.

An invention intended to provide a solution to the technical problem described above is found in U.S. Pat. No. 4,235,721 wherein as a means for fixing an expressing sheet to an opening in a core plate, a reinforcing patch plate is applied to a filtrate outlet port.

SUMMARY OF THE INVENTION

An object of the present invention is to provide an expressing plate assembly for a filter press, wherein misalignment of expressing sheets with respect to openings in a core plate is prevented.

A second object of the invention is to provide an expressing plate assembly for a filter press, wherein when expressing sheets are assembled to a core plate, bonding operation on members can be performed easily and accurately.

A further object of the invention is to provide an expressing plate for a filter press, wherein assembly of a core and expressing sheets is easy and exchange of the expressing plate can be easily effected. It is also an object of the invention to provide a filter press, wherein the pressure for expression can be increased to increase the filtration capacity.

According to the present invention, expressing plate assemblies of the following construction are provided:

An expressing plate for a filter press, wherein expressing sheets are applied to the surfaces of a rigid core plate and said expressing sheets are expanded, characterized in that a core plate formed with fitting recesses around the peripheral edges of openings provided for communication with holes in an expressing sheet, and said expressing sheet, which has raised portions on the back surface around said holes for fitting in said fitting recesses in the core plate are assembled together by using seating rings adapted to fit in said recesses and clamp said expressing sheets against said core plate; and An expressing plate for a filter press, wherein the openings in the core plate extend through the core plate, the peripheries of the expressing sheets are pressure-contacted with the opposite surfaces of the core plate, and said clamping seating rings form pairs which are fitted in the recesses in the expressing sheets placed on the opposite surfaces of said core plate, so that the expressing sheets and core plate are clamped and fixed together between the clamping rings of said pairs.

BRIEF DESCRIPTION OF THE DRAWINGS

The features of the invention will be more clearly understood from the description of an embodiment of the invention below with reference to the accompanying drawings wherein:

FIG. 4 is a fragmentary enlarged front view of a core plate;

FIG. 5 is a fragmentary enlarged front view of the expressing sheet of FIG. 2;

DESCRIPTION OF THE PREFERRED EMBODIMENTS

Figure 1:
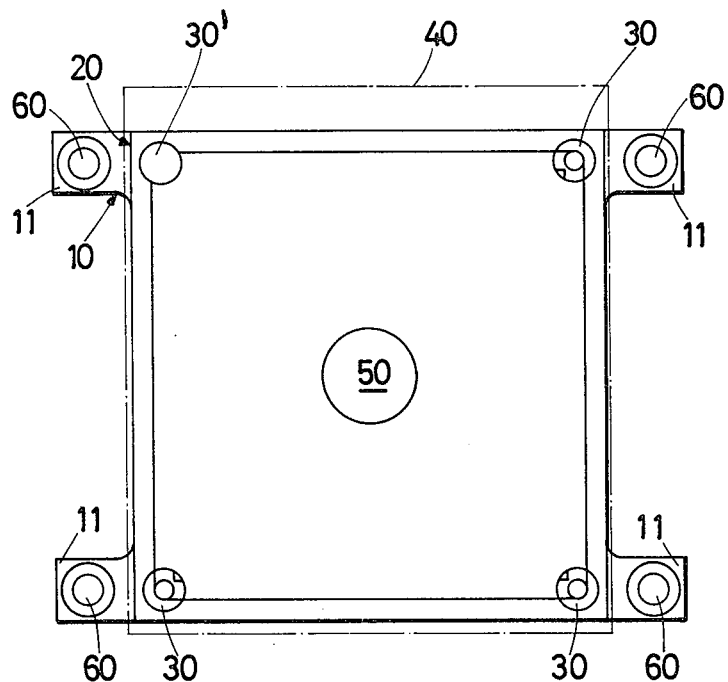
FIG. 1 is a front elevational view of an expressing plate according to an embodiment of the invention.
Figure 6:
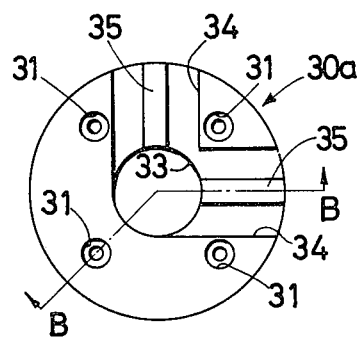
FIG. 6 is a front elevational view of the clamping seating ring.

FIG. 1 is a front view of an expressing plate according to an embodiment of the invention. The expressing plate comprises a rigid core plate 10 made of iron, plastic, or wood and having a contour shown in solid line, and flexible expressing sheets 20 fitted to the core plate 10 over the opposite surfaces thereof except ledges 11 at the four corners of the core plate, said expressing sheets being pressure contacted with the core plate. The numeral 30 denotes seating rings according to the present invention for clamping and fixing the expressing sheets 20 and core plate 10 at said position. The numeral 40 denotes filter cloth applied to the expressing plate, said filter cloth being shown in phantom line. The numeral 50 denotes a raw liquid passage hole, which is shown as the center feed type in the embodiment, but its position may be suitably determined. The numeral 60 denotes main passages provided in the ledges 11 of the core plate 10 for feeding or discharging liquid. As is known in the art, the complete passages are defined when a number of expressing plates or usual filter plates having the same shape as the expressing plates but not using expressing sheets are put together during operation. As for the use of said main passages 60, for example, those at the lower opposite corners are used for discharging the filtrate, one at the upper right for feeding a washing liquid, and one at the upper left for feeding an expressing fluid. In FIG. 1 ridges 25 and grooves 26 to be later described are not shown.

Figure 2:
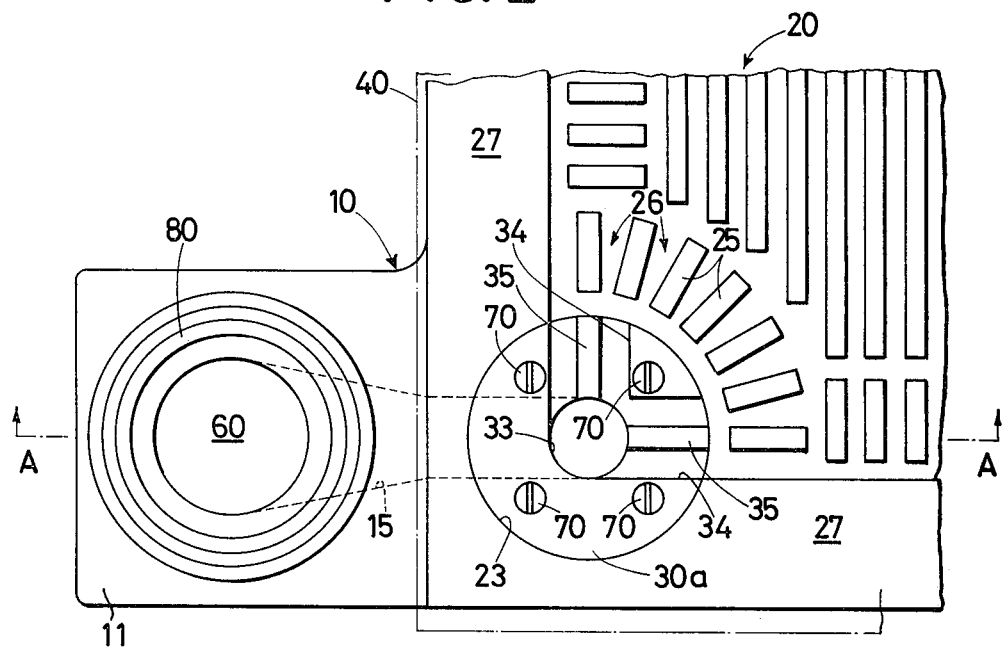
FIG. 2 is a fragmentary enlarged view of the expressing plate as shown in FIG. 1.
Figure 3:
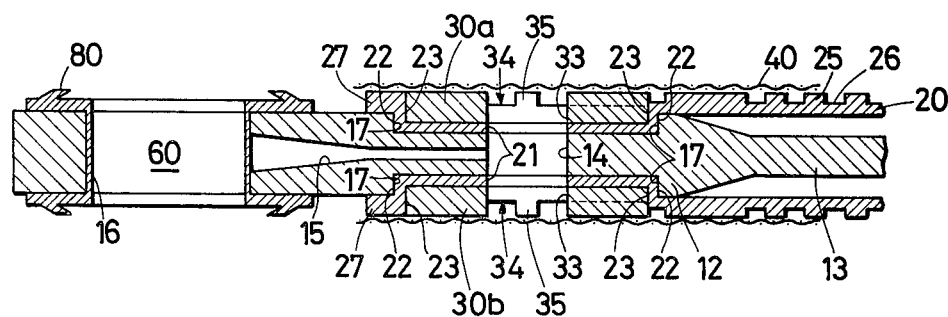
FIG. 3 is a cross-sectional view taken along the line A—A in FIG. 2.

Referring to FIGS. 2 through 4, the core plate 10 comprises a peripheral frame portion 12 forming the peripheral edge, and a central portion somewhat reduced in thickness, which is surrounded with said peripheral frame portion 12. The numeral 14 denotes openings at the four corners of the core plate 10 extending through the core plate. The openings 14 are connected with transverse interior holes 15 which are formed in the peripheral frame portion 12 of the core plate 10 and communicate with the holes 16 in the ledges 11 forming said main passages. The openings 14 are formed in the peripheral frame portion 12 of the core plate 10, and the peripheries of the openings on the opposite surfaces of the core plate 19 are formed with fitting recesses 17. The fitting recesses 17 are formed with holes 18 for receiving clamping screws 70.

As shown in FIGS. 2, 3 and 5, each expressing sheet 20 is formed with openings 21 at positions for communication with the openings 14 in said core plate 10. The peripheries around the openings 21 on the back of the expressing sheet 20 are formed with raised portions 22 adapted to fit in the fitting recesses 17 in the core plate 10. The peripheries around the openings 21 on the face of the expressing plate 20 are formed with recesses 23 adapted to receive the clamping seating rings 30. The face of the expressing sheet 20 is formed with a number of known ridges 25 for supporting the filter cloth 40. Adjacent ridges 25 define grooves 26 therebetween along which the filtrate flows. The numeral 27 denotes the peripheral thick portion of the expressing sheet 20.

Figure 7:
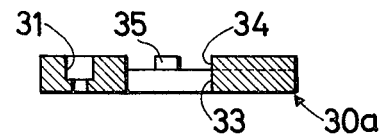
FIG. 7 is a cross-sectional view taken along the line B—B in FIG. 6.
Figure 8:
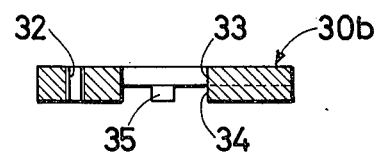
FIG. 8 is a cross-sectional view of another clamping seating ring to be paired with the clamping seating ring shown in FIGS. 6 and 7, the view corresponding to the section taken along the line B—B in FIG. 6.

Referring to FIGS. 2, 3, 6, 7, and 8, the clamping seating rings collectively denoted by the numeral 30 each consist of a pair comprising one seating ring 30a and the other 30b (FIGS. 7 and 8). The seating rings in each pair are the same except that one 30a is formed with screw receiving holes 31 for receiving clamping screws 70 and the other 30b with threaded holes 32 for threaded engagement with the clamping screws 70. The clamping seating ring 30 has a contour adapted to fit in the recess 23 in the expressing sheet 20, and a thickness such that when fitted in the recess 23, the clamping seating ring 30 is flush with the thick portion 27 of the expressing sheet 20. The numeral 33 denotes openings formed in the seating rings so that they communicate with the opening 21 in the expressing sheet 20. The numeral 34 denotes grooves formed in the clamping seating rings 30, defining passages for guiding the filtrate from the grooves in the expressing sheet 20 to the openings 33. The numeral 35 denotes ridges for preventing the filter cloth 40 from entering and closing the grooves 34. The numeral 80 denotes a packing fitted in the hole 16 in the ledge 11 of the core plate 10.

Assembly of the expressing plate is effected by first applying the expressing sheets 20 to the opposite surfaces of the core plate 10. At this time, the raised portions 22 of the expressing sheets 20 are fitted in the fitting recesses 17 in the core plate 10. Subsequently, the pair of clamping seating rings 30a and 30b are fitted in the recesses 23 in the expressing sheets 20 applied to the opposite surfaces of the core plate 10 while the grooves 34 are oriented as shown in FIG. 2 and the screw receiving holes 31 in the seating ring 30a, the threaded holes 32 in the seating ring 30b, and the holes 24 in the expressing sheets 20 are positioned so that they communicate with each other. The clamping screws 70 are then inserted into the seating ring 30a and threadedly engaged with the other seating ring 30b. This completes the expressing filter plate. In addition, when it is desired to form an expressing filter plate oriented to unilateral expression with the expressing sheet 20 applied to only one surface of the core plate 10, a recess for receiving the seating ring 30b will be formed directly in the core plate 10 on the side where the expressing sheet 20 is not applied. As shown in FIG. 3, the core plate 10 is formed with fitting recesses 17 at the four corners, while the expressing sheet 20 is formed with openings 21 and raised portions 22 at the four corners. In this embodiment, since the upper left corner is used for feeding an expressing fluid, there would be no need to provide the corresponding opening 21 in the expressing sheet 20; however, such opening 21 is actually provided to facilitate positioning in consideration of the other three corners. Instead, a seating ring 30' having no hole 33 and grooves 34 is fitted in the upper left corner to close the opening 21 in the expressing sheet 20. In addition, the upper left corner is formed with an unillustrated interior hole for feeding the expressing fluid from the main passage into the space between the core plate 10 and the expressing sheet 20.

Filtering operation will now be described. The expressing plates having the filter cloth 40 put thereon, or the usual filter plates having the same shape as the expressing plates but not using expressing sheets are put together, and a raw liquid is introduced into the raw liquid passage holes 50 to fill the spaces between the expressing plates. Subsequent to this filtration, an expressing fluid is fed through the main passages 60 at the upper left corners of the expressing plates into the spaces between the core plate 10 and the expressing sheets 20 to expand the latter. The filtrate provided by the filter cloth 40 flows along the grooves 26 in the faces of the expressing sheets 20 into the openings 33 in the seating rings 30 at the lower opposite corners of the expressing plates, from which it then flows through the openings 21 and 14 in the expressing sheets 20 and core plates 10 and through the interior holes 15 in the core plates 10 into the main passages 60. Washing which follows filtration and expression is effected by feeding a washing liquid from the main passages 60 at the upper right corners of the expressing plates, along a path reverse to that for filtration, through the interior holes 15 and openings 14 in the core plates 10 into the spaces between the faces of the expressing sheets 20 and the back of the filter cloth 40.

According to the present invention, since the expressing sheets 20 fit in the fitting recesses 17 in the core plate 10, deviation of the expressing sheets 20 from the core plate 10 is prevented. This is true not only before but also during filtering operation. Since the openings 21 in the expressing sheets which should communicate with the openings in the core plate 10 are formed in the recesses 23 in the expressing sheets 20 adapted to be fitted to the core plate 10, misalignment between the holes in the core plate 10 and in the expressing sheets 20 can be prevented. Further, since the clamping seating rings 30 are fitted in the recesses 23 in the expressing sheets 20 fitted in the core plate 10, the shifting between the expressing sheets 20 and between the openings 21 in the expressing sheets 20 can be prevented. Further, assembly of the expressing plate 20 is also easy since the positioning of the expressing sheets 20 can be effected by simply paying attention to fitting the raised portions 22 of the expressing sheets 20 in the fitting recesses 17 in the core plate 10.

What is claimed is:

1. In an expressing plate for a plate-type filter press wherein flexible expressing sheets cover the opposite surfaces of a rigid core plate, the core plate has a peripheral frame portion, expressing fluid being fed between the core plate and expressing sheets, and aligned filtrate discharge openings are provided in the peripheral portions of the core plate and expressing sheets, the improvement comprising, fitting recesses in the opposite surfaces of said core plate around each said opening therein, a raised portion around each said opening in each expressing sheet on the inner face thereof facing said core plate and having a peripheral shape substantially conforming to that of said adjacent fitting recess to interfit therein, a seating ring recess around each said opening in each expressing sheet on the outer side thereof and smaller than said adjacent fitting recess, seating rings each having an opening therethrough and a peripheral shape substantially conforming to that of the adjacent seating ring recess and interfitting therein so that a pair of seating rings is disposed at each core plate opening one on each side of said core plate with said seating ring openings aligned with said core plate openings, means to clamp each said pair of seating rings together to clamp said expressing sheets to said core plate and maintain alignment of said openings, a plurality of ridges defining grooves therebetween which serve as filtrate passages on the outer face of each expressing sheet, and filtrate passage grooves on a part of the outer face of each seating ring substantially aligned with said grooves on said expressing sheets to be substantially continuous therewith.

2. An expressing plate for a filter press as claimed in claim 1, wherein the core plate is rectangular in shape having four corners and further comprising openings in said four corners adapted to communicate with said openings in the expressing sheet.

3. An expressing plate as claimed in claim 2 and further comprising ledges extending outwardly at each corner of said core plate, main passages in said ledges for conducting fluid, and transverse interior holes at said corners of said core plate connecting said openings with the adjacent main passage.

4. An expressing plate for a filter press as claimed in claim 1, wherein said seating rings are dimensioned and attached so that the outer faces thereof are flush with the outer faces of the expressing sheets.

* * * * *